(12) United States Patent
Sun

(10) Patent No.: US 11,874,445 B2
(45) Date of Patent: Jan. 16, 2024

(54) CAMERA OPTICAL LENS

(71) Applicant: Changzhou Raytech Optronics Co., Ltd., Changzhou (CN)

(72) Inventor: Wei Sun, Shenzhen (CN)

(73) Assignee: Changzhou Raytech Optronics Co., Ltd., Changzhou (CN)

( * ) Notice: Subject to any disclaimer, the term of this patent is extended or adjusted under 35 U.S.C. 154(b) by 609 days.

(21) Appl. No.: 17/136,019

(22) Filed: Dec. 29, 2020

(65) Prior Publication Data

US 2022/0113502 A1   Apr. 14, 2022

(30) Foreign Application Priority Data

Oct. 13, 2020  (CN) .......................... 202011087332.X

(51) Int. Cl.
  *G02B 13/00* (2006.01)
  *G02B 9/64* (2006.01)
(52) U.S. Cl.
  CPC ........... *G02B 13/0045* (2013.01); *G02B 9/64* (2013.01)
(58) Field of Classification Search
  CPC .............. G02B 3/00; G02B 3/02; G02B 3/04; G02B 3/06; G02B 3/08; G02B 15/00–28; G02B 13/02; G02B 13/04; G02B 9/00–64; G02B 13/002–0045; G02B 13/18

USPC ................. 359/676–695, 745–795, 708–718
See application file for complete search history.

(56) References Cited

FOREIGN PATENT DOCUMENTS

JP      2020118922 A  *  8/2020  ........... G02B 13/002

* cited by examiner

*Primary Examiner* — James C. Jones
*Assistant Examiner* — Henry Duong
(74) *Attorney, Agent, or Firm* — W&G Law Group

(57) ABSTRACT

The present disclosure discloses a camera optical lens including eight lenses which are, from an object-side to an-image side: a first lens having a positive refractive power, a second lens having a negative refractive power, a third lens having a negative refractive power, a fourth lens having a positive refractive power, a fifth lens having a positive refractive power, a sixth lens having a refractive power, a seventh lens having a negative refractive power and an eight lens having a negative refractive power, which satisfies following conditions: $0.95 \leq f/TTL$; $-5.00 \leq f2/f \leq -2.00$; and $0.40 \leq (R9+R10)/(R9-R10) \leq 1.00$; where TTL denotes a total optical length from an object-side surface of the first lens to an image surface of the camera optical lens along an optic axis; f denotes a focal length of the camera optical lens. The camera optical lens can achieve good optical performance while meeting the design requirement for long focal length and ultra-thinness.

10 Claims, 9 Drawing Sheets

CAMERA OPTICAL LENS

TECHNICAL FIELD

The present disclosure relates to the field of optical lens, in particular to a camera optical lens suitable for handheld devices, such as smart phones and digital cameras, and imaging devices, such as monitors or PC lenses.

BACKGROUND

With the emergence of smart phones in recent years, the demand for miniature camera lens is increasing day by day, but in general the photosensitive devices of camera lens are nothing more than Charge Coupled Device (CCD) or Complementary Metal-Oxide Semiconductor Sensor (CMOS sensor), and as the progress of the semiconductor manufacturing technology makes the pixel size of the photosensitive devices become smaller, plus the current development trend of electronic products towards better functions and thinner and smaller dimensions, miniature camera lens with good imaging quality therefore have become a mainstream in the market.

In order to obtain better imaging quality, the lens that is traditionally equipped in mobile phone cameras adopts a three-piece, four-piece, or even five-piece or six-piece lens structure. However, with the development of technology and the increase of the diverse demands of users, and as the pixel area of photosensitive devices is becoming smaller and smaller and the requirement of the camera optical lens on the imaging quality is improving constantly, the eight-piece lens structure gradually appears in lens designs. Although the typical eight-piece lens already has good optical performance, its optical power, lens spacing and lens shape remain unreasonable to some extents, resulting in that the lens structure, which, even though, has excellent optical performance, is not able to meet the design requirement for long focal length and ultra-thinness.

SUMMARY

A camera optical lens is provided, including eight lenses which are, from an object side to an image side in sequence: a first lens having a positive refractive power, a second lens having a negative refractive power, a third lens having a negative refractive power, a fourth lens having a positive refractive power, a fifth lens having a positive refractive power, a sixth lens having a refractive power, a seventh lens having a negative refractive power and an eighth lens having a negative refractive power; wherein the camera optical lens satisfies following conditions: $0.95 \le f/TTL$; $-5.00 \le f2/f \le -2.00$; and $0.40 \le (R9+R10)/(R9-R10) \le 1.00$; where TTL denotes a total optical length from an object-side surface of the first lens to an image surface of the camera optical lens along an optical axis; f denotes a focal length of the camera optical lens; f2 denotes a focal length of the second lens; R9 denotes a central curvature radius of an object-side surface of the fifth lens; and R10 denotes a central curvature radius of an image-side surface of the fifth lens.

As an improvement, the camera optical lens further satisfies the following condition: $0.10 \le d13/d14 \le 1.30$; where d13 denotes an on-axis thickness of the seventh lens; and d14 denotes an on-axis distance from an image-side surface of the seventh lens to an object-side surface of the eighth lens.

As an improvement, the camera optical lens further satisfies following conditions: $0.23 \le f1/f \le 1.11$; $-4.40 \le (R1+R2)/(R1-R2) \le -0.47$; and $0.04 \le d1/TTL \le 0.14$; where f1 denotes a focal length of the first lens; R1 denotes a central curvature radius of the object-side surface of the first lens; R2 denotes a central curvature radius of an image-side surface of the first lens; and d1 denotes an on-axis thickness of the first lens.

As an improvement, the camera optical lens further satisfies following conditions: $-1.32 \le (R3+R4)/(R3-R4) \le 13.70$; and $0.02 \le d3/TTL \le 0.06$; where R3 denotes a central curvature radius of an object-side surface of the second lens; R4 denotes a central curvature radius of an image-side surface of the second lens; and d3 denotes an on-axis thickness of the second lens.

As an improvement, the camera optical lens further satisfies following conditions: $-49.20 \le f3/f \le -0.96$; $0.33 \le (R5+R6)/(R5-R6) \le 39.23$; and $0.02 \le d5/TTL \le 0.09$; where f3 denotes a focal length of the third lens; R5 denotes a central curvature radius of an object-side surface of the third lens; R6 denotes a central curvature radius of an image-side surface of the third lens; and d5 denotes an on-axis thickness of the third lens.

As an improvement, wherein the camera optical lens further satisfies following conditions: $0.55 \le f4/f \le 12.72$; $0.64 \le (R7+R8)/(R7-R8) \le 9.96$; and $0.02 \le d7/TTL \le 0.11$; where f4 denotes a focal length of the fourth lens; R7 denotes a central curvature radius of an object-side surface of the fourth lens; R8 denotes a central curvature radius of an image-side surface of the fourth lens; and d7 denotes an on-axis thickness of the fourth lens.

As an improvement, the camera optical lens further satisfies following conditions: $1.00 \le f5/f \le 21.01$; and $0.02 \le d9/TTL \le 0.08$; where f5 denotes a focal length of the fifth lens; and d9 denotes an on-axis thickness of the fifth lens.

As an improvement, the camera optical lens further satisfies following conditions: $-12.41 \le f6/f \le 33.12$; $-63.27 \le (R11+R12)/(R11-R12) \le 37.28$; and $0.04 \le d11/TTL \le 0.19$; where f6 denotes a focal length of the sixth lens; R11 denotes a central curvature radius of an object-side surface of the sixth lens; R12 denotes a central curvature radius of an image-side surface of the sixth lens; and d11 denotes an on-axis thickness of the sixth lens.

As an improvement, the camera optical lens further satisfies following conditions: $-3.19 \le f7/f \le -0.43$; $-1.07 \le (R13+R14)/(R13-R14) \le 1.26$; and $0.02 \le d13/TTL \le 0.28$; where f7 denotes a focal length of the seventh lens; R13 denotes a central curvature radius of an object-side surface of the seventh lens; R14 denotes a central curvature radius of an image-side surface of the seventh lens; and d13 denotes an on-axis thickness of the seventh lens.

As an improvement, the camera optical lens further satisfies following conditions: $-2.44 \le f8/f \le -0.45$; $0.95 \le (R15+R16)/(R15-R16) \le 3.81$; and $0.03 \le d15/TTL \le 0.10$; where f8 denotes a focal length of the eighth lens; R15 denotes a central curvature radius of an object-side surface of the eighth lens; R16 denotes a central curvature radius of an image-side surface of the eighth lens; and d15 denotes an on-axis thickness of the eighth lens.

BRIEF DESCRIPTION OF DRAWINGS

To illustrate the technical solutions according to the embodiments of the present disclosure or in the prior art more clearly, the accompanying drawings for describing the embodiments or the prior art are introduced briefly in the following. Apparently, the accompanying drawings in the following description are only some embodiments of the present disclosure, and persons of ordinary skill in the art can derive other drawings from the accompanying drawings without creative efforts.

DETAILED DESCRIPTION OF EMBODIMENTS

To make the objects, technical solutions, and advantages of the present disclosure clearer, embodiments of the present disclosure are described in detail with reference to accompanying drawings in the following. A person of ordinary skill in the art can understand that, in the embodiments of the present disclosure, many technical details are provided to make readers better understand the present disclosure. However, even without these technical details and any changes and modifications based on the following embodiments, technical solutions required to be protected by the present disclosure can be implemented.

Embodiment 1

Figure 1:
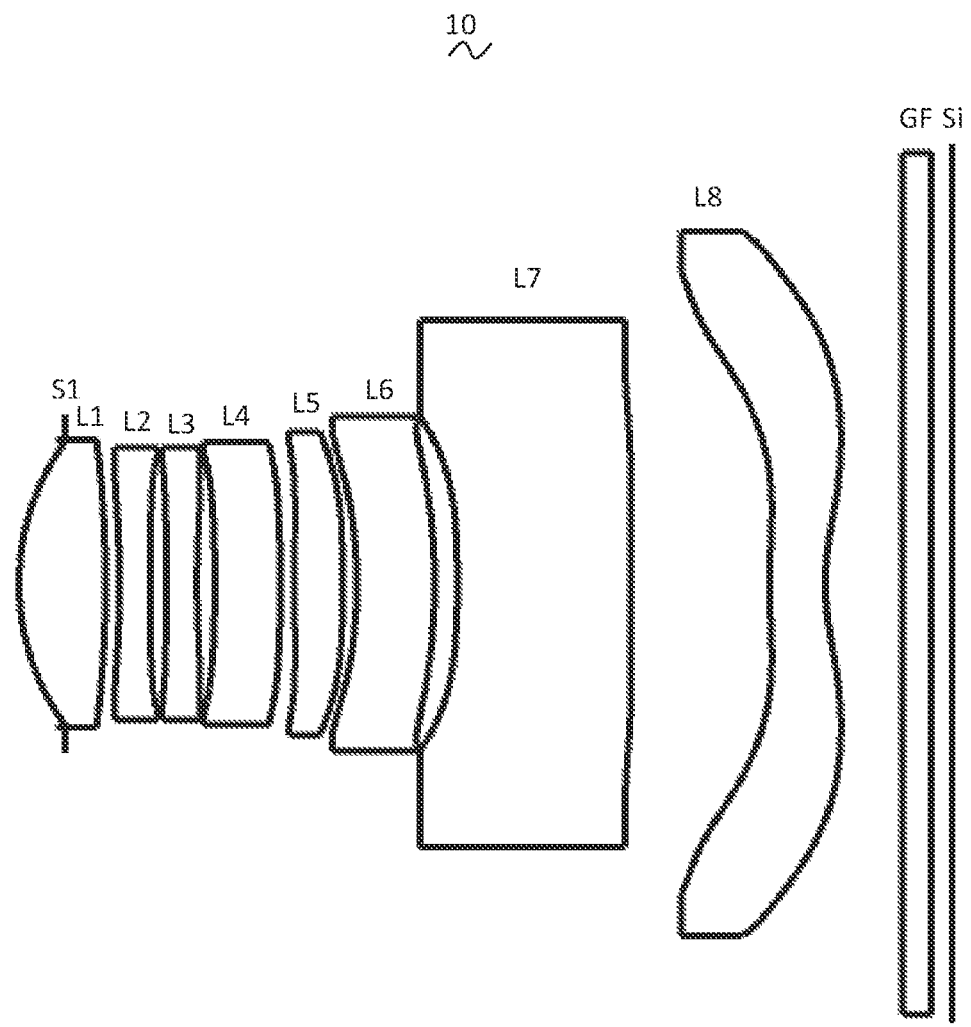
FIG. 1 is a schematic diagram of a structure of a camera optical lens according to Embodiment 1 of the present disclosure.

Referring to the accompanying drawing, the present disclosure provides a camera optical lens 10. FIG. 1 shows a schematic diagram of a structure of a camera optical lens 10 provided in Embodiment 1 of the present disclosure, and the camera optical lens 10 includes eight lenses. Specifically, the camera optical lens 10 includes, from an object side to an image side in sequence: an aperture S1, a first lens L1, a second lens L2, a third lens L3, a fourth lens L4, a fifth lens L5, a sixth lens L6, a seventh lens L7 and an eighth lens L8. An optical element such as an optical filter GF can be arranged between the eighth lens L8 and an image surface Si.

In this embodiment, the first lens L1 has a positive refractive power, the second lens L2 has a negative refractive power, the third lens L3 has a negative refractive power, the fourth lens L4 has a positive refractive power, the fifth lens L5 has a positive refractive power, the sixth lens L6 has a negative refractive power, the seventh lens L7 has a negative refractive power and the eighth lens L8 has a negative refractive power. In this embodiment, the first lens L1 has a positive refractive power, which facilitates improvement of optical performance of the camera optical lens.

In this embodiment, the first lens L1, the second lens L2, the third lens L3, the fourth lens L4, the fifth lens L5, the sixth lens L6, the seventh lens L7 and the eighth lens L8 are made of plastic material. In other embodiments, the lenses may be made of other material.

In this embodiment, a total optical length from an object-side surface of the first lens L1 to an image surface Si of the camera optical lens 10 along an optical axis is defined as TTL, and a focal length of the camera optical lens 10 is defined as f, a focal length of the second lens L2 is defined as f2, a central curvature radius of an object-side surface of the fifth lens L5 is defined as R9, and a central curvature radius of an image-side surface of the fifth lens L5 is defined as R10. The camera optical lens 10 satisfies following conditions:

$$0.95 \leq f/TTL; \quad (1)$$

$$-5.00 \leq f2/f \leq -2.00; \quad (2)$$

$$0.40 \leq (R9+R10)/(R9-R10) \leq 1.00. \quad (3)$$

Condition (1) specifies a ratio of the focal length f of the camera optical lens 10 and the total optical length TTL from the object-side surface of the first lens L1 to the image surface Si of the camera optical lens 10 along the optical axis. When the condition (1) is satisfied, given the same optical length, the camera optical lens 10 has a longer focal length.

Condition (2) specifies a ratio of the focal length f2 of the second lens L2 and the focal length f of the camera optical lens 10, which can effectively balance a spherical aberration and a field curvature of the camera optical lens.

Condition (3) specifies a shape of the fifth lens L5. Within this range, a deflection degree of lights passing through the lens can be alleviated, and the aberration can be effectively reduced.

An on-axis thickness of the seventh lens L7 is defined as d13, and an on-axis distance from an image-side surface of the seventh lens L7 to an object-side surface of the eighth lens L8 is defined as d14. The camera optical lens 10 satisfies the following condition: $0.10 \leq d13/d14 \leq 1.30$, which specifies a ratio of the on-axis thickness d13 of the seventh lens L7 and the on-axis distance d14 from the image-side surface of the seventh lens L7 to the object-side surface of the eighth lens L8. Within this range, it is beneficial for reducing the total optical length of the camera optical lens and a development of the lenses towards ultra-thinness.

In this embodiment, the first lens L1 includes an object-side surface being convex in a paraxial region and an image-side surface being convex in the paraxial region.

The focal length of the camera optical lens 10 is defined as f, and a focal length of the first lens L1 is defined as f1. The camera optical lens 10 satisfies the following condition: $0.23 \leq f1/f \leq 1.11$, which specifies a ratio of the focal length f1 of the first lens L1 to the focal length f of the camera optical lens 10. Within this range, the first lens L1 has an appropriate positive refractive power, which is beneficial for reducing the aberration of the camera optical lens and a development of the lenses towards ultra-thinness. Preferably, the camera optical lens 10 satisfies the following condition: $0.37 \leq f1/f \leq 0.89$.

A central curvature radius of the object-side surface of the first lens L1 is defined as R1, and a central curvature radius of an image-side surface of the first lens L1 is defined as R2.

The camera optical lens 10 satisfies the following condition: $-4.40 \leq (R1+R2)/(R1-R2) \leq -0.47$. This can reasonably control a shape of the first lens L1 in such a manner that the first lens L1 can effectively correct the spherical aberration of the camera optical lens. Preferably, the camera optical lens 10 satisfies the following condition: $-2.75 \leq (R1+R2)/(R1-R2) \leq -0.58$.

An on-axis thickness of the first lens L1 is defined as d1, and the total optical length from the object-side surface of the first lens L1 to the image surface Si of the camera optical lens 10 along the optical axis is defined as TTL. The camera optical lens 10 satisfies the following condition: $0.04 \leq d1/TTL \leq 0.14$. Within this range, it is beneficial for realization of ultra-thin lenses. This can facilitate achieving ultra-thinness of the lenses. Preferably, the camera optical lens 10 satisfies the following condition: $0.06 \leq d1/TTL \leq 0.11$.

In this embodiment, the second lens L2 includes an object-side surface being concave in the paraxial region and an image-side surface being concave in the paraxial region.

A central curvature radius of an object-side surface of the second lens L2 is defined as R3, and a central curvature radius of an image-side surface of the second lens L2 is defined as R4. The camera optical lens 10 satisfies the following condition: $-1.32 \leq (R3+R4)/(R3-R4) \leq 13.70$, which specifies a shape of the second lens L2. Within this range, a development of the lenses towards ultra-thinness would facilitate correcting an on-axis chromatic aberration. Preferably, the camera optical lens 10 satisfies the following condition: $-0.82 \leq (R3+R4)/(R3-R4) \leq 10.96$.

An on-axis thickness of the second lens L2 is defined as d3, and the total optical length from the object-side surface of the first lens L1 to the image surface Si of the camera optical lens 10 along the optical axis is defined as TTL. The camera optical lens 10 satisfies the following condition: $0.02 \leq d3/TTL \leq 0.06$. Within this range, it is beneficial for realization of ultra-thin lenses. Preferably, the camera optical lens 10 satisfies the following condition: $0.03 \leq d3/TTL \leq 0.04$.

In this embodiment, the third lens L3 includes an object-side surface being concave in the paraxial region and an image-side surface being concave in the paraxial region.

The focal length of the camera optical lens 10 is defined as f, and a focal length of the third lens L3 is defined as f3. The camera optical lens 10 satisfies the following condition: $-49.20 \leq f3/f \leq -0.96$. With reasonable distribution of the refractive power, the camera optical lens has better imaging quality and lower sensitivity. Preferably, the camera optical lens 10 satisfies the following condition: $-30.75 \leq f3/f \leq -1.20$.

A central curvature radius of an object-side surface of the third lens L3 is defined as R5, a central curvature radius of an image-side surface of the third lens L3 is defined as R6. The camera optical lens 10 satisfies the following condition: $0.33 \leq (R5+R6)/(R5-R6) \leq 39.23$, which can effectively control a shape of the third lens L3 and is better for the shaping of the third lens L3. Within this range, a deflection degree of lights passing through the lens can be alleviated, and the aberration can be effectively reduced. Preferably, the camera optical lens 10 satisfies the following condition: $0.53 \leq (R5+R6)/(R5-R6) \leq 31.38$.

The on-axis thickness of the third lens L3 is defined as d5, and the total optical length from the object-side surface of the first lens L1 to the image surface Si of the camera optical lens 10 along the optical axis is defined as TTL. The camera optical lens 10 satisfies the following condition: $0.02 \leq d5/TTL \leq 0.09$. Within this range, it is beneficial for realization of ultra-thin lenses. Preferably, the camera optical lens 10 satisfies the following condition: $0.03 \leq d5/TTL \leq 0.07$.

In this embodiment, the fourth lens L4 includes an object-side surface being concave in the paraxial region and an image-side surface being convex in the paraxial region.

The focal length of the camera optical lens 10 is defined as f, and a focal length of the fourth lens L4 is defined as f4. The camera optical lens 10 satisfies the following condition: $0.55 \leq f4/f \leq 12.72$. With reasonable distribution of the refractive power, the camera optical lens has better imaging quality and lower sensitivity. Preferably, the camera optical lens 10 satisfies the following condition: $0.88 \leq f4/f \leq 10.17$.

A central curvature radius of the object-side surface of the fourth lens L4 is defined as R7, and a central curvature radius of an image-side surface of the fourth lens L4 is defined as R8. The camera optical lens 10 satisfies the following condition: $0.64 \leq (R7+R8)/(R7-R8) \leq 9.96$, which specifies a shape of the fourth lens L4. Within this range, the development of the lenses towards ultra-thinness would facilitate correcting an off-axis aberration. Preferably, the camera optical lens 10 satisfies the following condition: $1.03 \leq (R7+R8)/(R7-R8) \leq 7.97$.

An on-axis thickness of the fourth lens L4 is defined as d7, and the total optical length from the object-side surface of the first lens L1 to the image surface Si of the camera optical lens 10 along the optical axis is defined as TTL. The camera optical lens 10 satisfies the following condition: $0.02 \leq d7/TTL \leq 0.11$. Within this range, it is beneficial for realization of ultra-thin lenses. Preferably, the camera optical lens 10 satisfies the following condition: $0.03 \leq d7/TTL \leq 0.08$.

In this embodiment, the fifth lens L5 includes an object-side surface being convex in the paraxial region and an image-side surface being convex in the paraxial region.

The focal length of the camera optical lens 10 is defined as f, and a focal length of the fifth lens L5 is defined as f5. The camera optical lens 10 satisfies the following condition: $1.00 \leq f5/f \leq 21.01$, which can effectively make a light angle of the camera lens gentle and reduce tolerance sensitivity. Preferably, the camera optical lens 10 satisfies the following condition: $1.59 \leq f5/f \leq 16.81$.

An on-axis thickness of the fifth lens L5 is defined as d9, and the total optical length from the object-side surface of the first lens L1 to the image surface Si of the camera optical lens 10 along the optical axis is defined as TTL. The camera optical lens 10 satisfies the following condition: $0.02 \leq d9/TTL \leq 0.08$. Within this range, it is beneficial for realization of ultra-thin lenses. Preferably, the camera optical lens 10 satisfies the following condition: $0.03 \leq d9/TTL \leq 0.06$.

In this embodiment, the sixth lens L6 includes an object-side surface being concave in the paraxial region and an image-side surface being convex in the paraxial region.

The focal length of the camera optical lens 10 is defined as f, and a focal length of the sixth lens L6 is defined as f6. The camera optical lens 10 satisfies the following condition: $-12.41 \leq f6/f \leq 33.12$. With reasonable distribution of the refractive power, the camera optical lens has better imaging quality and lower sensitivity. Preferably, the camera optical lens 10 satisfies the following condition: $-7.76 \leq f6/f \leq 26.50$.

A central curvature radius of an object-side surface of the sixth lens L6 is defined as R11, and a central curvature radius of an image-side surface of the sixth lens L6 is defined as R12. The camera optical lens 10 satisfies the following condition: $-63.27 \leq (R11+R12)/(R11-R12) \leq 37.28$, which specifies a shape of the sixth lens L6. Within this range, the development of the lenses towards ultra-thinness would facilitate correcting the off-axis aberration.

Preferably, the camera optical lens 10 satisfies the following condition: −39.54≤(R11+R12)/(R11−R12)≤29.83.

An on-axis thickness of the sixth lens L6 is defined as d11, and the total optical length from the object-side surface of the first lens L1 to the image surface Si of the camera optical lens 10 along the optical axis is defined as TTL. The camera optical lens 10 satisfies the following condition: 0.04≤d11/TTL≤0.19. Within this range, it is beneficial for realization of ultra-thin lenses. Preferably, the camera optical lens 10 satisfies the following condition: 0.07≤d11/TTL≤0.15.

In this embodiment, the seventh lens L7 includes an object-side surface being concave in the paraxial region and an image-side surface being concave in the paraxial region.

The focal length of the camera optical lens 10 is defined as f, and a focal length of the seventh lens L7 is defined as f7. The camera optical lens 10 satisfies the following condition: −3.19≤f7/f≤−0.43. With reasonable distribution of the refractive power, the camera optical lens has better imaging quality and lower sensitivity. Preferably, the camera optical lens 10 satisfies the following condition: −1.99≤f7/f≤−0.53.

A central curvature radius of an object-side surface of the seventh lens L7 is defined as R13, and a central curvature radius of an image-side surface of the seventh lens L7 is defined as R14. The camera optical lens 10 satisfies the following condition: −1.07≤(R13+R14)/(R13−R14)≤1.26, which specifies a shape of the seventh lens L7. Within this range, the development of the lenses towards ultra-thinness would facilitate correcting the off-axis aberration. Preferably, the camera optical lens 10 satisfies the following condition: −0.67≤(R13+R14)/(R13−R14)≤1.01.

An on-axis thickness of the seventh lens L7 is defined as d13, and the total optical length from the object-side surface of the first lens L1 to the image surface Si of the camera optical lens 10 along the optical axis is defined as TTL. The camera optical lens 10 satisfies the following condition: 0.02≤d13/TTL≤0.28. Within this range, it is beneficial for realization of ultra-thin lenses. Preferably, the camera optical lens 10 satisfies the following condition: 0.03≤d13/TTL≤0.22.

In this embodiment, the eighth lens L8 includes an object-side surface being convex in the paraxial region and an image-side surface being concave in the paraxial region.

The focal length of the camera optical lens 10 is defined as f, and a focal length of the eighth lens L8 is defined as f8. The camera optical lens 10 satisfies the following condition: −2.44≤f8/f≤−0.45. With reasonable distribution of the refractive power, the camera optical lens has better imaging quality and lower sensitivity. Preferably, the camera optical lens 10 satisfies the following condition: −1.53≤f8/f≤−0.57.

A central curvature radius of an object-side surface of the eighth lens L8 is defined as R15, and a central curvature radius of an image-side surface of the eighth lens L8 is defined as R16. The camera optical lens 10 satisfies the following condition: 0.95≤(R15+R16)/(R15−R16)≤3.81, which specifies a shape of the eighth lens L8. Within this range, the development of the lenses towards ultra-thinness would facilitate correcting the off-axis aberration. Preferably, the camera optical lens 10 satisfies the following condition: 1.52≤(R15+R16)/(R15−R16)≤3.05.

An on-axis thickness of the eighth lens L8 is defined as d15, and the total optical length from the object-side surface of the first lens L1 to the image surface Si of the camera optical lens 10 along the optical axis is defined as TTL. The camera optical lens 10 satisfies the following condition: 0.03≤d15/TTL≤0.10. Within this range, it is beneficial for realization of ultra-thin lenses. Preferably, the camera optical lens 10 satisfies the following condition: 0.05≤d15/TTL≤0.08.

In this embodiment, an image height of the camera optical lens 10 is defined as IH, and the focal length of the camera optical lens 10 is defined as f. The camera optical lens 10 satisfies the following condition: f/IH≥1.95, which makes the camera optical lens have a long focal length.

In an embodiment, the image height of the camera optical lens 10 is defined as IH, the total optical length from the object-side surface of the first lens L1 to the image surface Si of the camera optical lens 10 along the optical axis is defined as TTL. The camera optical lens 10 satisfies the following condition: TTL/IH≤2.05, which is for realization of ultra-thin lenses.

In this embodiment, the focal length of the camera optical lens 10 is defined as f, and a combined focal length of the first lens L1 and the second lens L2 is defined as f12. The camera optical lens 10 satisfies the following condition: 0.29≤f12/f≤1.25. Within this condition, the aberration and distortion of the camera optical lens 10 can be eliminated and a back focal length of the camera optical lens is reduced, so that miniaturization of the camera optical lens can be maintained. Preferably, the camera optical lens 10 satisfies the following condition: 0.46≤f12/f≤1.00.

It should be appreciated that, in other embodiments, configuration of object-side surfaces and image-side surfaces of the first lens L1, the second lens L2, the third lens L3, the fourth lens L4, the fifth lens L5, the sixth lens L6, the seventh lens L7 and the eighth lens L8 may have a distribution in convex and concave other than that of the above-described embodiment.

When the above conditions are satisfied, the camera optical lens 10 meets the design requirement for long focal length and ultra-thinness while having excellent optical imaging performance. Based on the characteristics of the camera optical lens 10, the camera optical lens 10 is particularly applicable to mobile camera lens assemblies and WEB camera lenses composed of such camera elements as CCD and CMOS for high pixels.

The camera optical lens 10 will be further described with reference to the following examples. Symbols used in various examples are shown as follows. The focal length, on-axis distance, central curvature radius, on-axis thickness, inflexion point position, and arrest point position are all in units of mm.

TTL: Total optical length (the distance from the object-side surface of the first lens L1 to the image surface Si of the camera optical lens along the optical axis) in mm.

FNO: Ratio of an effective focal length and an entrance pupil diameter of the camera optical lens.

Preferably, inflexion points and/or arrest points can be arranged on the object-side surface and/or the image-side surface of each lens, so as to satisfy the demand for high quality imaging. The description below can be referred for specific implementations.

The design data of the camera optical lens 10 in Embodiment 1 of the present disclosure are shown in Table 1 and Table 2.

TABLE 1

|  | R |  | d | nd |  | vd |
| --- | --- | --- | --- | --- | --- | --- |
| S1 | ∞ | d0= | −0.332 |  |  |  |
| R1 | 1.896 | d1= | 0.623 | nd1 | 1.5444 | v1 | 55.82 |
| R2 | −10.762 | d2= | 0.100 |  |  |  |

TABLE 1-continued

| | R | d | | nd | | vd |
|---|---|---|---|---|---|---|
| R3 | −10.157 | d3= | 0.220 | nd2 | 1.6400 v2 | 23.54 |
| R4 | 49.567 | d4= | 0.119 | | | |
| R5 | −30.174 | d5= | 0.220 | nd3 | 1.5444 v3 | 55.82 |
| R6 | 6.093 | d6= | 0.129 | | | |
| R7 | −11.207 | d7= | 0.476 | nd4 | 1.5444 v4 | 55.82 |
| R8 | −8.273 | d8= | 0.100 | | | |
| R9 | 23.497 | d9= | 0.348 | nd5 | 1.5444 v5 | 55.82 |
| R10 | −9.951 | d10= | 0.100 | | | |
| R11 | −3.381 | d11= | 0.563 | nd6 | 1.6400 v6 | 23.54 |
| R12 | −4.143 | d12= | 0.164 | | | |
| R13 | −7.428 | d13= | 1.246 | nd7 | 1.5444 v7 | 55.82 |
| R14 | 24.418 | d14= | 1.005 | | | |
| R15 | 4.817 | d15= | 0.400 | nd8 | 1.5350 v8 | 55.71 |
| R16 | 1.84 | d16= | 0.556 | | | |
| R17 | ∞ | d17= | 0.210 | ndg | 1.5168 vg | 64.17 |
| R18 | ∞ | d18= | 0.147 | | | |

In the table, meanings of various symbols will be described as follows.

S1: aperture;

R: a central curvature radius of an optical surface;

R1: central curvature radius of the object-side surface of the first lens L1;

R2: central curvature radius of the image-side surface of the first lens L1;

R3: central curvature radius of the object-side surface of the second lens L2;

R4: central curvature radius of the image-side surface of the second lens L2;

R5: central curvature radius of the object-side surface of the third lens L3;

R6: central curvature radius of the image-side surface of the third lens L3;

R7: central curvature radius of the object-side surface of the fourth lens L4;

R8: central curvature radius of the image-side surface of the fourth lens L4;

R9: central curvature radius of the object-side surface of the fifth lens L5;

R10: central curvature radius of the image-side surface of the fifth lens L5;

R11: central curvature radius of the object-side surface of the sixth lens L6;

R12: central curvature radius of the image-side surface of the sixth lens L6;

R13: central curvature radius of the object-side surface of the seventh lens L7;

R14: central curvature radius of the image-side surface of the seventh lens L7;

R15: central curvature radius of an object-side surface of the eighth lens L8;

R16: central curvature radius of an image-side surface of the eighth lens L8;

R17: central curvature radius of an object-side surface of the optical filter GF;

R18: central curvature radius of an image-side surface of the optical filter GF;

d: on-axis thickness of a lens and an on-axis distance between lenses;

d0: on-axis distance from the aperture S1 to the object-side surface of the first lens L1;

d1: on-axis thickness of the first lens L1;

d2: on-axis distance from the image-side surface of the first lens L1 to the object-side surface of the second lens L2;

d3: on-axis thickness of the second lens L2;

d4: on-axis distance from the image-side surface of the second lens L2 to the object-side surface of the third lens L3;

d5: on-axis thickness of the third lens L3;

d6: on-axis distance from the image-side surface of the third lens L3 to the object-side surface of the fourth lens L4;

d7: on-axis thickness of the fourth lens L4;

d8: on-axis distance from the image-side surface of the fourth lens L4 to the object-side surface of the fifth lens L5;

d9: on-axis thickness of the fifth lens L5;

d10: on-axis distance from the image-side surface of the fifth lens L5 to the object-side surface of the six lens L6;

d11: on-axis thickness of the sixth lens L6;

d12: on-axis distance from the image-side surface of the sixth lens L6 to the object-side surface of the seventh lens L7;

d13: on-axis thickness of the seventh lens L7;

d14: on-axis distance from the image-side surface of the seventh lens L7 to the object-side surface of the eighth lens L8;

d15: on-axis thickness of the eighth lens L8;

d16: on-axis distance from the image-side surface of the eighth lens L8 to the object-side surface of the optical filter GF;

d17: on-axis thickness of the optical filter GF;

d18: on-axis distance from the image-side surface of the optical filter GF to the image surface Si;

nd: refractive index of a d line;

nd1: refractive index of a d line of the first lens L1;

nd2: refractive index of a d line of the second lens L2;

nd3: refractive index of a d line of the third lens L3;

nd4: refractive index of a d line of the fourth lens L4;

nd5: refractive index of a d line of the fifth lens L5;

nd6: refractive index of a d line of the sixth lens L6;

nd7: refractive index of a d line of the seventh lens L7;

nd8: refractive index of a d line of the eighth lens L8;

ndg: refractive index of a d line of the optical filter GF;

vd: abbe number;

v1: abbe number of the first lens L1;

v2: abbe number of the second lens L2;

v3: abbe number of the third lens L3;

v4: abbe number of the fourth lens L4;

v5: abbe number of the fifth lens L5;

v6: abbe number of the sixth lens L6;

v7: abbe number of the seventh lens L7;

v8: abbe number of the eighth lens L8;

vg: abbe number of the optical filter GF.

Table 2 shows aspherical surface data of the camera optical lens 10 in Embodiment 1 of the present disclosure.

TABLE 2

| | Conic coefficient | Aspheric surface coefficients | | | | |
|---|---|---|---|---|---|---|
| | k | A4 | A6 | A8 | A10 | A12 |
| R1 | 1.5659E−01 | 8.7248E−05 | 1.7840E−02 | −6.0721E−02 | 1.2630E−01 | −1.4799E−01 |
| R2 | −3.7770E+01 | −5.1627E−02 | 1.1856E−01 | −2.0611E−01 | 3.1295E−01 | −3.4237E−01 |
| R3 | −3.2802E+01 | −4.9322E−02 | 1.4098E−01 | −2.7196E−01 | 4.7335E−01 | −5.3207E−01 |
| R4 | −9.9000E+01 | 8.7611E−02 | −1.7781E−01 | 2.8068E−01 | −2.6958E−01 | 1.9381E−01 |
| R5 | −9.9000E+01 | 8.0332E−02 | −5.0505E−01 | 1.1902E+00 | −1.7821E+00 | 1.7484E+00 |
| R6 | −9.9000E+01 | 3.9628E−02 | −5.2921E−01 | 1.5305E+00 | −2.4348E+00 | 2.3548E+00 |
| R7 | 9.4025E+01 | 3.9366E−02 | −2.8855E−01 | 7.7593E−01 | −1.2366E+00 | 1.1342E+00 |
| R8 | −3.9219E+00 | 6.3287E−02 | −1.8008E−01 | 3.8430E−01 | −7.6839E−01 | 8.2693E−01 |
| R9 | −9.9000E+01 | −3.9750E−03 | −1.9759E−01 | 6.0299E−01 | −1.2134E+00 | 1.3649E+00 |
| R10 | 4.4181E+01 | 3.6020E−02 | −4.1278E−01 | 7.3833E−01 | −7.9879E−01 | 6.2581E−01 |
| R11 | 3.1599E+00 | 1.3880E−01 | −4.2416E−01 | 5.3944E−01 | −2.1370E−01 | −1.3782E−01 |
| R12 | −1.3013E+01 | 5.3289E−02 | −1.9605E−01 | 2.1361E−01 | −3.9282E−02 | −8.2799E−02 |
| R13 | −1.7203E+01 | −2.8700E−02 | −1.2811E−01 | 1.0613E−01 | 1.1344E−02 | −5.6390E−02 |
| R14 | 9.9000E+01 | −3.1024E−02 | 1.0632E−02 | −6.4188E−03 | 3.1092E−03 | −5.0116E−04 |
| R15 | 2.9285E+00 | −2.0611E−01 | 6.4318E−02 | 1.8748E−02 | −2.8247E−02 | 1.1802E−02 |
| R16 | −3.5430E+00 | −2.0068E−01 | 1.1028E−01 | −3.8859E−02 | 8.5444E−03 | −1.1656E−03 |

| | Conic coefficient | Aspheric surface coefficients | | | |
|---|---|---|---|---|---|
| | k | A14 | A16 | A18 | A20 |
| R1 | 1.5659E−01 | 8.8861E−02 | −2.2739E−02 | 0.0000E+00 | 0.0000E+00 |
| R2 | −3.7770E+01 | 2.1301E−01 | −5.5915E−02 | 0.0000E+00 | 0.0000E+00 |
| R3 | −3.2802E+01 | 3.4657E−01 | −9.6294E−02 | 0.0000E+00 | 0.0000E+00 |
| R4 | −9.9000E+01 | −5.7793E−02 | −1.7831E−04 | 0.0000E+00 | 0.0000E+00 |
| R5 | −9.9000E+01 | −1.0125E+00 | 2.6203E−01 | 0.0000E+00 | 0.0000E+00 |
| R6 | −9.9000E+01 | −1.3443E+00 | 3.4641E−01 | 0.0000E+00 | 0.0000E+00 |
| R7 | 9.4025E+01 | −5.9927E−01 | 1.5139E−01 | 0.0000E+00 | 0.0000E+00 |
| R8 | −3.9219E+00 | −4.3138E−01 | 9.1113E−02 | 0.0000E+00 | 0.0000E+00 |
| R9 | −9.9000E+01 | −7.7422E−01 | 1.7270E−01 | 0.0000E+00 | 0.0000E+00 |
| R10 | 4.4181E+01 | −3.1733E−01 | 7.1609E−02 | 0.0000E+00 | 0.0000E+00 |
| R11 | 3.1599E+00 | 1.5461E−01 | −3.7922E−02 | 0.0000E+00 | 0.0000E+00 |
| R12 | −1.3013E+01 | 5.7423E−02 | −1.0333E−02 | 0.0000E+00 | 0.0000E+00 |
| R13 | −1.7203E+01 | 2.5271E−02 | −3.0700E−03 | 0.0000E+00 | 0.0000E+00 |
| R14 | 9.9000E+01 | −1.6824E−05 | 6.9769E−06 | 0.0000E+00 | 0.0000E+00 |
| R15 | 2.9285E+00 | −2.4327E−03 | 2.5295E−04 | −1.0672E−05 | 0.0000E+00 |
| R16 | −3.5430E+00 | 9.1899E−05 | −3.2159E−06 | 0.0000E+00 | 0.0000E+00 |

In table 2, K is a conic coefficient, and A4, A6, A8, A10, A12, A14, A16, A18 and A20 are aspheric surface coefficients.

$$y=(x^2/R)/\{1+[1-(k+1)(x^2/R^2)]^{1/2}\}+A4x^4+A6x^6+A8x^8+A10x^{10}+A12x^{12}+A14x^{14}+A16x^{16}+A18x^{18}+A20x^{20} \quad (4)$$

Herein, x denotes a vertical distance between a point in an aspheric curve and the optical axis, and y denotes an aspheric depth (i.e. a vertical distance between the point having a distance of x from the optical axis and a plane tangent to a vertex on the optical axis of an aspheric surface).

For convenience, an aspheric surface of each lens surface uses the aspheric surfaces shown in the above condition (4). However, the present disclosure is not limited to the aspherical polynomials form shown in the condition (4).

Table 3 and Table 4 show design data of inflexion points and arrest points of each lens of the camera optical lens 10 in Embodiment 1 of the present disclosure. Herein, P1R1 and P1R2 represent the object-side surface and the image-side surface of the first lens L1, P2R1 and P2R2 represent the object-side surface and the image-side surface of the second lens L2, P3R1 and P3R2 represent the object-side surface and the image-side surface of the third lens L3, P4R1 and P4R2 represent the object-side surface and the image-side surface of the fourth lens L4, P5R1 and P5R2 represent the object-side surface and the image-side surface of the fifth lens L5, P6R1 and P6R2 represent the object-side surface and the image-side surface of the sixth lens L6, P7R1 and P7R2 represent the object-side surface and the image-side surface of the seventh lens L7, and P8R1 and P8R2 represent the object-side surface and the image-side surface of the eighth lens L8. The data in the column named "inflexion point position" refers to vertical distances from inflexion points arranged on each lens surface to the optic axis of the camera optical lens 10. The data in the column named "arrest point position" refers to vertical distances from arrest points arranged on each lens surface to the optical axis of the camera optical lens 10.

TABLE 3

| | Number(s) of inflexion points | Inflexion point position 1 | Inflexion point position 2 | Inflexion point position 3 | Inflexion point position 4 |
|---|---|---|---|---|---|
| P1R1 | 0 | / | / | / | / |
| P1R2 | 0 | / | / | / | / |
| P2R1 | 1 | 0.665 | / | / | / |
| P2R2 | 0 | / | / | / | / |
| P3R1 | 1 | 0.905 | / | / | / |
| P3R2 | 2 | 0.405 | 0.985 | / | / |
| P4R1 | 0 | / | / | / | / |
| P4R2 | 1 | 0.995 | / | / | / |
| P5R1 | 1 | 0.325 | / | / | / |
| P5R2 | 1 | 1.135 | / | / | / |
| P6R1 | 1 | 0.975 | / | / | / |
| P6R2 | 1 | 0.945 | / | / | / |
| P7R1 | 0 | / | / | / | / |

TABLE 3-continued

| | Number(s) of inflexion points | Inflexion point position 1 | Inflexion point position 2 | Inflexion point position 3 | Inflexion point position 4 |
|---|---|---|---|---|---|
| P7R2 | 4 | 0.355 | 1.325 | 1.805 | 2.045 |
| P8R1 | 4 | 0.305 | 1.705 | 2.195 | 2.375 |
| P8R2 | 1 | 0.505 | / | / | / |

TABLE 4

| | Number(s) of arrest points | Arrest point position 1 | Arrest point position 2 | Arrest point position 3 |
|---|---|---|---|---|
| P1R1 | 0 | / | / | / |
| P1R2 | 0 | / | / | / |
| P2R1 | 1 | 0.935 | / | / |
| P2R2 | 0 | / | / | / |
| P3R1 | 0 | / | / | / |
| P3R2 | 1 | 0.825 | / | / |
| P4R1 | 0 | / | / | / |
| P4R2 | 0 | / | / | / |
| P5R1 | 1 | 0.525 | / | / |
| P5R2 | 0 | / | / | / |
| P6R1 | 0 | / | / | / |
| P6R2 | 1 | 1.195 | / | / |
| P7R1 | 0 | / | / | / |
| P7R2 | 3 | 0.635 | 1.705 | 1.885 |
| P8R1 | 1 | 0.555 | / | / |
| P8R2 | 1 | 1.075 | / | / |

Figure 2:
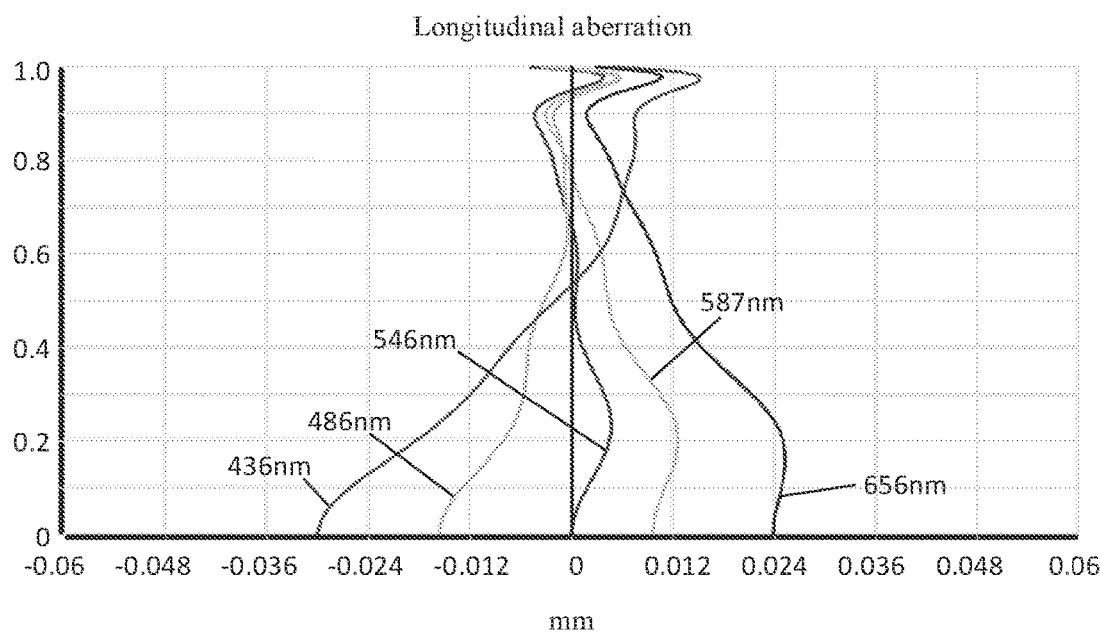
FIG. 2 is a schematic diagram of a longitudinal aberration of the camera optical lens shown in FIG. 1.
Figure 3:
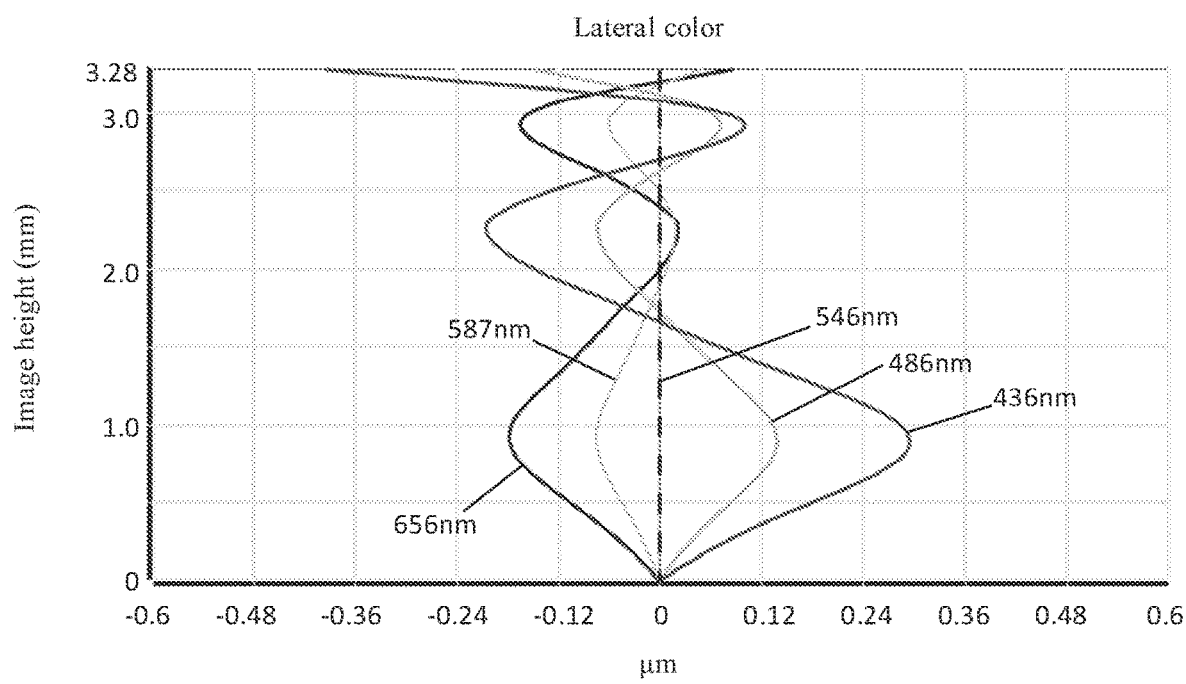
FIG. 3 is a schematic diagram of a lateral color of the camera optical lens shown in FIG. 1.
Figure 4:
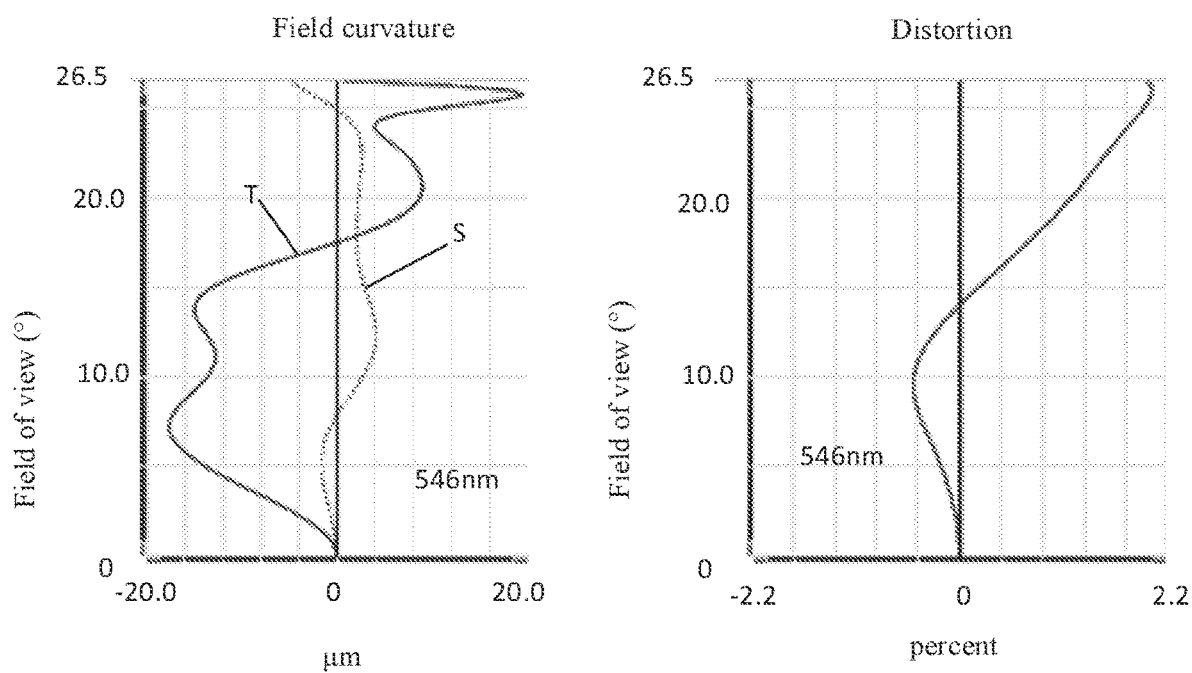
FIG. 4 is a schematic diagram of a field curvature and a distortion of the camera optical lens shown in FIG. 1.

FIG. 2 and FIG. 3 show a longitudinal aberration and a lateral color of light with wavelengths of 656 nm, 587 nm, 546 nm, 486 nm and 436 nm after passing the camera optical lens 10 in Embodiment 1. FIG. 4 illustrates a schematic diagram of a field curvature and a distortion of light with a wavelength of 546 nm after passing the camera optical lens 10 in Embodiment 1. A field curvature S in FIG. 4 is a field curvature in a sagittal direction, and T is a field curvature in a tangential direction.

Table 13 in the following shows various values of Embodiments 1, 2 and 3 and values corresponding to the parameters specified in the above conditions.

As shown in Table 13, Embodiment 1 satisfies the various conditions.

In this Embodiment, an entrance pupil diameter (ENPD) of the camera optical lens 10 is 2.157 mm, an image height (IH) of 1.0H is 3.282 mm, and a field of view (FOV) in a diagonal direction is 53.00°. Thus, the camera optical lens 10 meets the design requirement for long focal length and ultra-thinness. Its on-axis and off-axis chromatic aberrations are sufficiently corrected, thereby achieving excellent optical performance.

Embodiment 2

Embodiment 2 is basically the same as Embodiment 1, and the meaning of its symbols is the same as that of Embodiment 1. In the following, only differences are described.

Figure 5:
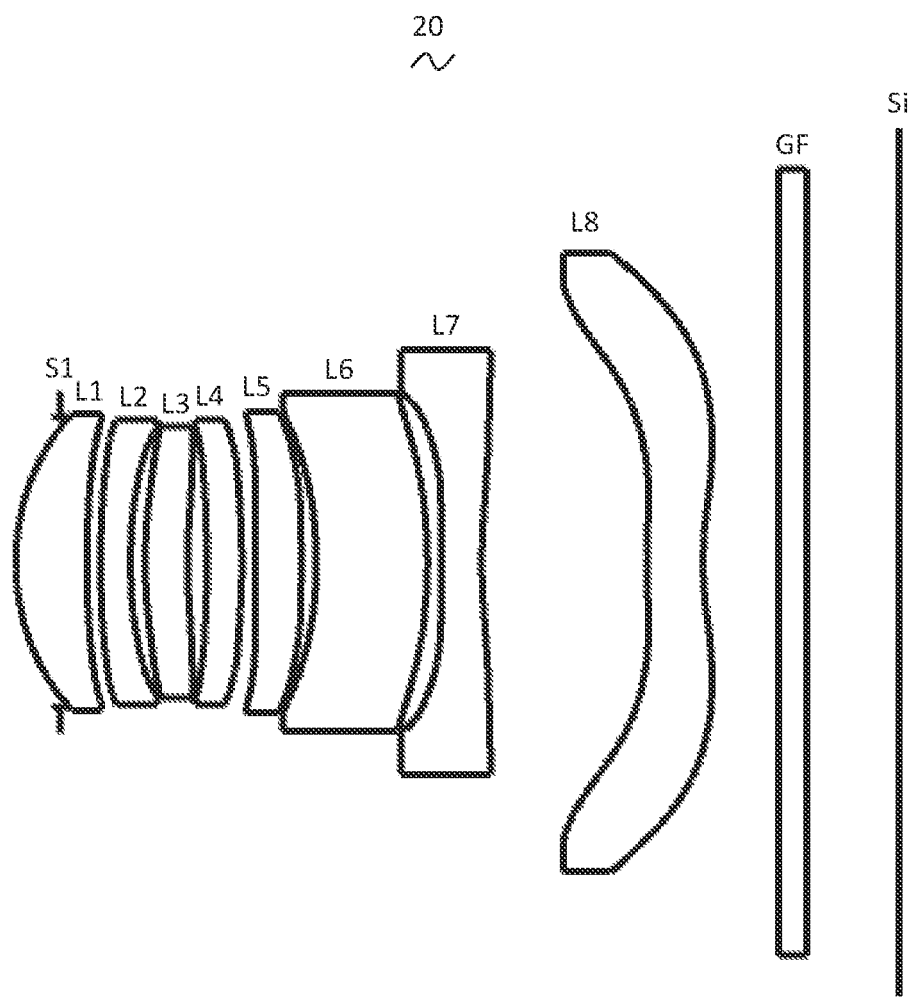
FIG. 5 is a schematic diagram of a structure of a camera optical lens according to Embodiment 2 of the present disclosure.

FIG. 5 shows a schematic diagram of a structure of a camera optical lens 20 in Embodiment 2 of the present disclosure. In this embodiment, the sixth lens L6 has a positive refractive power, the first lens L1 has an image-side surface being concave in the paraxial region, the second lens L2 has an object-side surface being convex in the paraxial region, and the third lens L3 has an object-side surface being convex in the paraxial region.

Table 5 and Table 6 show design data of the camera optical lens 20 in Embodiment 2 of the present disclosure.

TABLE 5

| | R | d | | nd | | vd | |
|---|---|---|---|---|---|---|---|
| S1 | ∞ | d0= | −0.327 | | | | |
| R1 | 1.809 | d1= | 0.522 | nd1 | 1.5444 | v1 | 55.82 |
| R2 | 6.023 | d2= | 0.100 | | | | |
| R3 | 6.042 | d3= | 0.220 | nd2 | 1.6400 | v2 | 23.54 |
| R4 | 4.247 | d4= | 0.112 | | | | |
| R5 | 5.083 | d5= | 0.309 | nd3 | 1.5444 | v3 | 55.82 |
| R6 | 4.636 | d6= | 0.140 | | | | |
| R7 | −12.375 | d7= | 0.260 | nd4 | 1.5444 | v4 | 55.82 |
| R8 | −5.862 | d8= | 0.100 | | | | |
| R9 | 61.700 | d9= | 0.335 | nd5 | 1.5444 | v5 | 55.82 |
| R10 | −10.888 | d10= | 0.110 | | | | |
| R11 | −3.186 | d11= | 0.821 | nd6 | 1.6400 | v6 | 23.54 |
| R12 | −3.394 | d12= | 0.099 | | | | |
| R13 | −51.855 | d13= | 0.300 | nd7 | 1.5444 | v7 | 55.82 |
| R14 | 4.448 | d14= | 1.214 | | | | |
| R15 | 5.360 | d15= | 0.413 | nd8 | 1.5350 | v8 | 55.71 |
| R16 | 2.330 | d16= | 0.556 | | | | |
| R17 | ∞ | d17= | 0.210 | ndg | 1.5168 | vg | 64.17 |
| R18 | ∞ | d18= | 0.680 | | | | |

Table 6 shows aspherical surface data of each lens of the camera optical lens 20 in Embodiment 2 of the present disclosure.

TABLE 6

| | Conic coefficient | Aspheric surface coefficients | | | | |
|---|---|---|---|---|---|---|
| | k | A4 | A6 | A8 | A10 | A12 |
| R1 | 2.3495E−01 | −6.2811E−03 | 2.9645E−02 | −7.2073E−02 | 1.3954E−01 | −1.5234E−01 |
| R2 | 1.9934E+01 | −1.2093E−01 | 2.5504E−01 | −1.7679E−01 | 1.1508E−02 | −7.2259E−02 |
| R3 | −4.2598E+00 | −8.2534E−02 | 2.5929E−02 | 7.3547E−01 | −1.7866E+00 | 1.7948E+00 |
| R4 | −4.3233E+00 | 2.4346E−01 | −1.1237E+00 | 3.2122E+00 | −5.1818E+00 | 4.7459E+00 |
| R5 | 1.4451E+01 | 2.9661E−01 | −1.5766E+00 | 3.4734E+00 | −4.1520E+00 | 2.6438E+00 |
| R6 | −8.6605E+01 | 1.2875E−01 | −1.0191E+00 | 2.2760E+00 | −1.9053E+00 | −2.6643E−01 |
| R7 | 9.7047E+01 | −5.3681E−02 | −6.4921E−02 | 7.0935E−01 | −8.2575E−01 | −5.8423E−01 |
| R8 | −2.9574E+00 | 6.0401E−02 | −3.8988E−01 | 2.0124E+00 | −4.8413E+00 | 5.6174E+00 |
| R9 | −9.9000E+01 | 1.4207E−01 | −1.0699E+00 | 3.0275E+00 | −5.3724E+00 | 5.7584E+00 |
| R10 | 6.5098E+01 | 2.1619E−01 | −1.3509E+00 | 2.5199E+00 | −2.1754E+00 | 8.0168E−01 |
| R11 | 5.1593E+00 | 1.6815E−01 | −7.7871E−01 | 1.1687E+00 | −1.6719E−01 | −1.1420E+00 |
| R12 | −3.2438E+00 | 1.0392E−01 | −3.9498E−01 | 6.0884E−01 | −5.0457E−01 | 2.4833E−01 |
| R13 | 9.9000E+01 | 1.4693E−02 | −2.9061E−01 | 2.9222E−01 | −1.2532E−01 | 2.8026E−02 |
| R14 | −9.4270E+01 | 2.8400E−02 | −8.5285E−02 | 3.8253E−02 | 2.1182E−02 | −2.3403E−02 |
| R15 | 4.2728E+00 | −2.3540E−01 | 1.1201E−01 | −1.1836E−02 | −2.4300E−02 | 1.5037E−02 |
| R16 | −9.2954E+00 | −1.7045E−01 | 1.0324E−01 | −4.2686E−02 | 1.0688E−02 | −1.6062E−03 |

TABLE 6-continued

| | Conic coefficient | Aspheric surface coefficients | | | |
|---|---|---|---|---|---|
| | k | A14 | A16 | A18 | A20 |
| R1 | 2.3495E−01 | 8.5132E−02 | −1.9049E−02 | 0.0000E+00 | 0.0000E+00 |
| R2 | 1.9934E+01 | 1.4746E−01 | −6.0402E−02 | 0.0000E+00 | 0.0000E+00 |
| R3 | −4.2598E+00 | −8.2290E−01 | 1.4141E−01 | 0.0000E+00 | 0.0000E+00 |
| R4 | −4.3233E+00 | −2.2442E+00 | 4.2500E−01 | 0.0000E+00 | 0.0000E+00 |
| R5 | 1.4451E+01 | −6.7590E−01 | −2.7628E−02 | 0.0000E+00 | 0.0000E+00 |
| R6 | −8.6605E+01 | 1.2772E+00 | −5.2511E−01 | 0.0000E+00 | 0.0000E+00 |
| R7 | 9.7047E+01 | 1.3075E+00 | −5.1251E−01 | 0.0000E+00 | 0.0000E+00 |
| R8 | −2.9574E+00 | −3.2006E+00 | 7.2652E−01 | 0.0000E+00 | 0.0000E+00 |
| R9 | −9.9000E+01 | −3.3060E+00 | 7.6988E−01 | 0.0000E+00 | 0.0000E+00 |
| R10 | 6.5098E+01 | −3.4830E−02 | −3.1642E−02 | 0.0000E+00 | 0.0000E+00 |
| R11 | 5.1593E+00 | 1.0297E+00 | −2.7041E−01 | 0.0000E+00 | 0.0000E+00 |
| R12 | −3.2438E+00 | −7.2621E−02 | 1.0243E−02 | 0.0000E+00 | 0.0000E+00 |
| R13 | 9.9000E+01 | −7.5528E−03 | 8.1533E−04 | 0.0000E+00 | 0.0000E+00 |
| R14 | −9.4270E+01 | 7.3147E−03 | −7.9507E−04 | 0.0000E+00 | 0.0000E+00 |
| R15 | 4.2728E+00 | −3.8570E−03 | 4.7437E−04 | −2.3086E−05 | 0.0000E+00 |
| R16 | −9.2954E+00 | 1.3431E−04 | −4.7772E−06 | 0.0000E+00 | 0.0000E+00 |

Table 7 and table 8 show design data of inflexion points and arrest points of each lens of the camera optical lens 20 in Embodiment 2 of the present disclosure.

TABLE 7

| | Number(s) of inflexion points | Inflexion point position 1 | Inflexion point position 2 | Inflexion point position 3 |
|---|---|---|---|---|
| P1R1 | 0 | / | / | / |
| P1R2 | 0 | / | / | / |
| P2R1 | 0 | / | / | / |
| P2R2 | 0 | / | / | / |
| P3R1 | 1 | 0.935 | / | / |
| P3R2 | 1 | 0.385 | / | / |
| P4R1 | 2 | 0.965 | 1.025 | / |
| P4R2 | 1 | 1.045 | / | / |
| P5R1 | 2 | 0.315 | 1.075 | / |
| P5R2 | 0 | / | / | / |
| P6R1 | 2 | 1.045 | 1.115 | / |
| P6R2 | 1 | 1.165 | / | / |
| P7R1 | 0 | / | / | / |
| P7R2 | 3 | 0.555 | 1.105 | 1.445 |
| P8R1 | 2 | 0.275 | 1.625 | / |
| P8R2 | 2 | 0.445 | 2.345 | / |

TABLE 8

| | Number(s) of arrest points | Arrest point position 1 |
|---|---|---|
| P1R1 | 0 | / |
| P1R2 | 0 | / |
| P2R1 | 0 | / |
| P2R2 | 0 | / |
| P3R1 | 0 | / |
| P3R2 | 1 | 0.895 |
| P4R1 | 0 | / |
| P4R2 | 0 | / |
| P5R1 | 1 | 0.445 |
| P5R2 | 0 | / |
| P6R1 | 0 | / |
| P6R2 | 0 | / |
| P7R1 | 0 | / |
| P7R2 | 1 | 1.625 |
| P8R1 | 1 | 0.495 |
| P8R2 | 1 | 0.895 |

Figure 6:
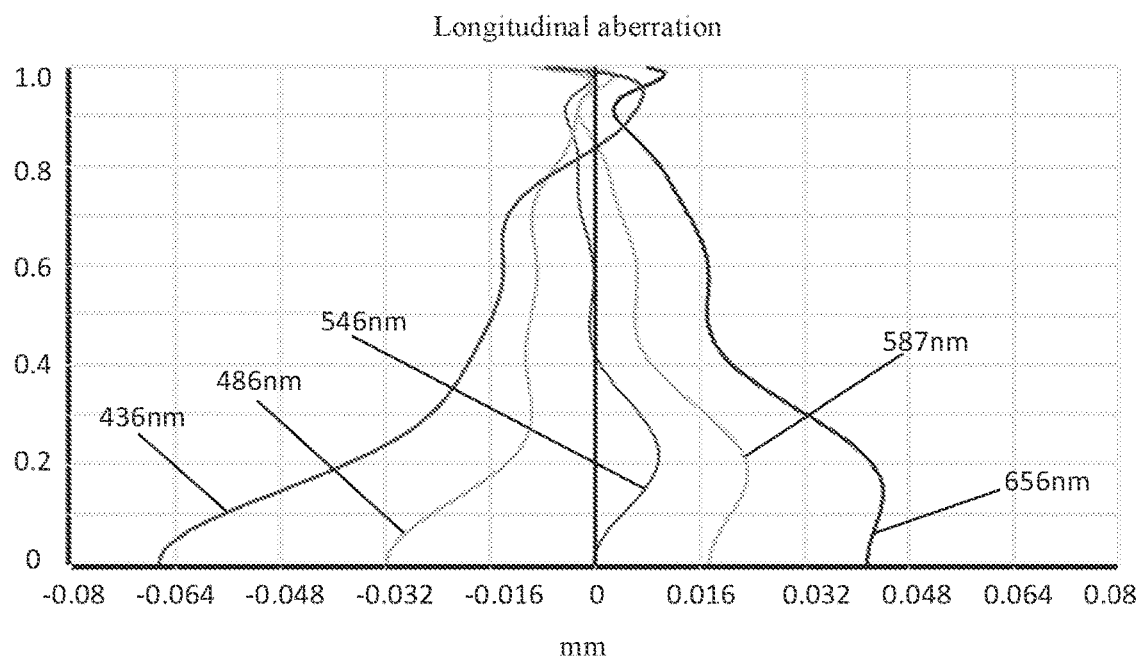
FIG. 6 is a schematic diagram of a longitudinal aberration of the camera optical lens shown in FIG. 5.
Figure 7:
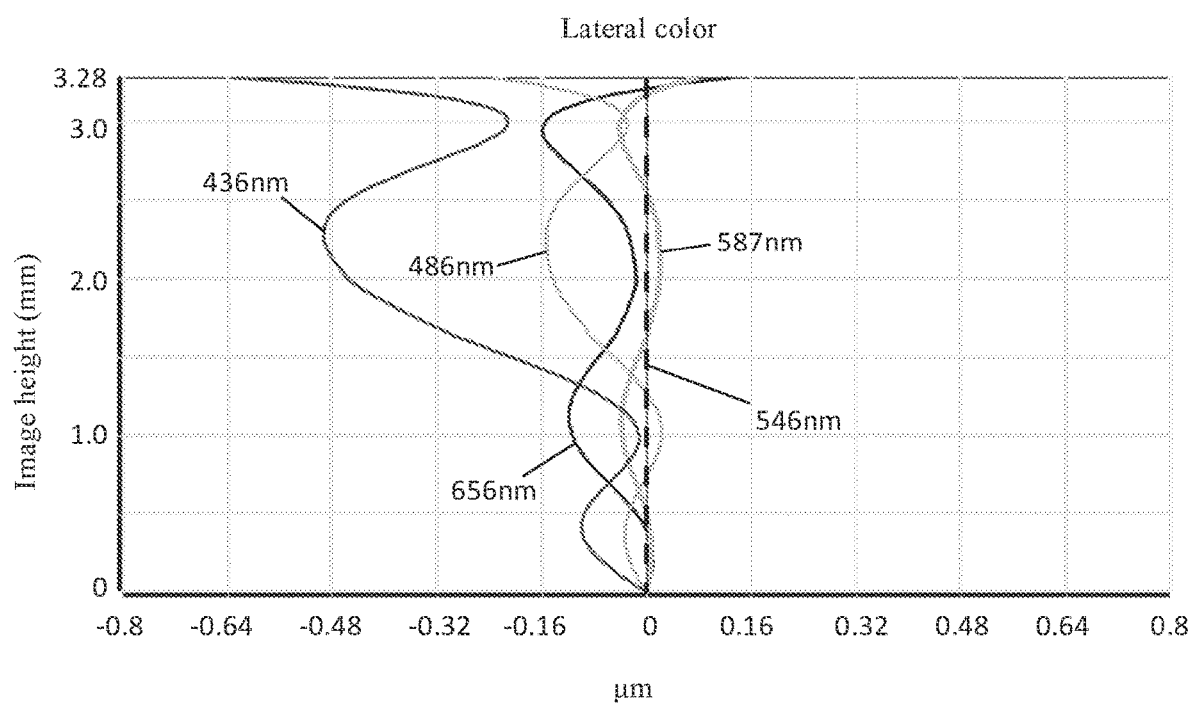
FIG. 7 is a schematic diagram of a lateral color of the camera optical lens shown in FIG. 5.
Figure 8:
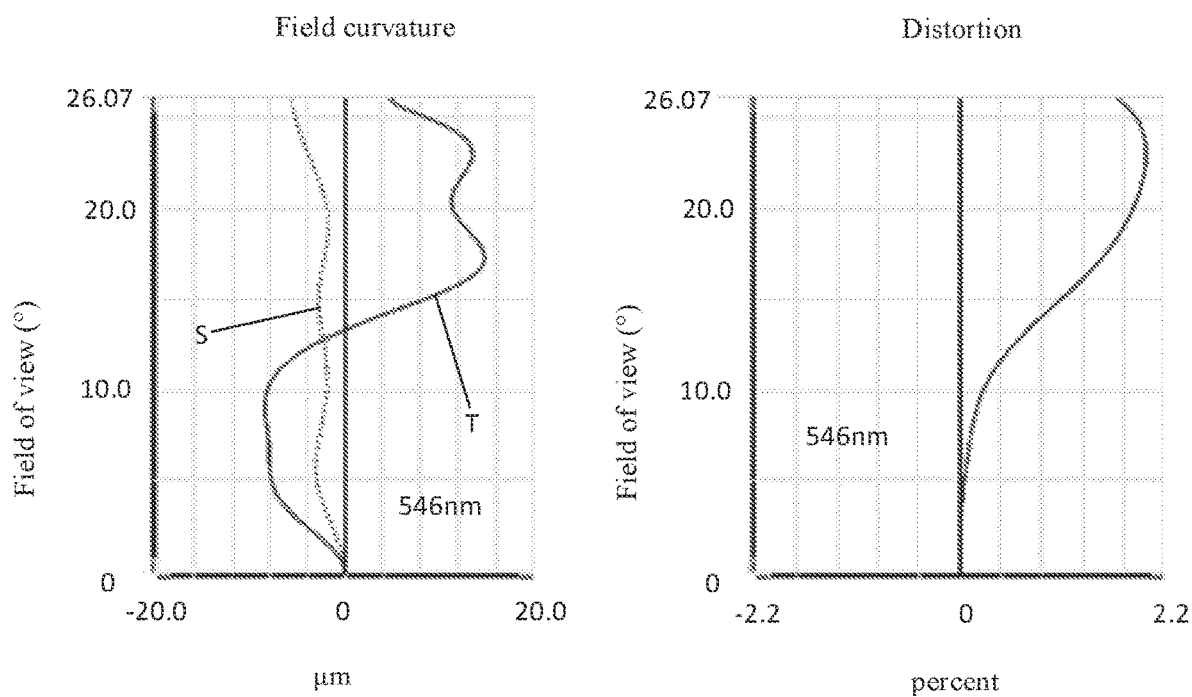
FIG. 8 is a schematic diagram of a field curvature and a distortion of the camera optical lens shown in FIG. 5.

FIG. 6 and FIG. 7 show a longitudinal aberration and a lateral color of light with wavelengths of 656 nm, 587 nm, 546 nm, 486 nm and 436 nm after passing the camera optical lens 20 in Embodiment 2. FIG. 8 illustrates a schematic diagram of a field curvature and a distortion of light with a wavelength of 546 nm after passing the camera optical lens 20 in Embodiment 2. A field curvature S in FIG. 8 is a field curvature in a sagittal direction, and T is a field curvature in a tangential direction.

As shown in Table 13, Embodiment 2 satisfies the various conditions.

In this embodiment, an entrance pupil diameter (ENPD) of the camera optical lens 20 is 2.199 mm, an image height (IH) of 1.0H is 3.282 mm, and a field of view (FOV) in a diagonal direction is 52.13°. Thus, the camera optical lens 20 meets the design requirement for long focal length and ultra-thinness. Its on-axis and off-axis chromatic aberrations are sufficiently corrected, thereby achieving excellent optical performance.

Embodiment 3

Embodiment 3 is basically the same as Embodiment 1, and the meaning of its symbols is the same as that of Embodiment 1. In the following, only differences are described.

Figure 9:
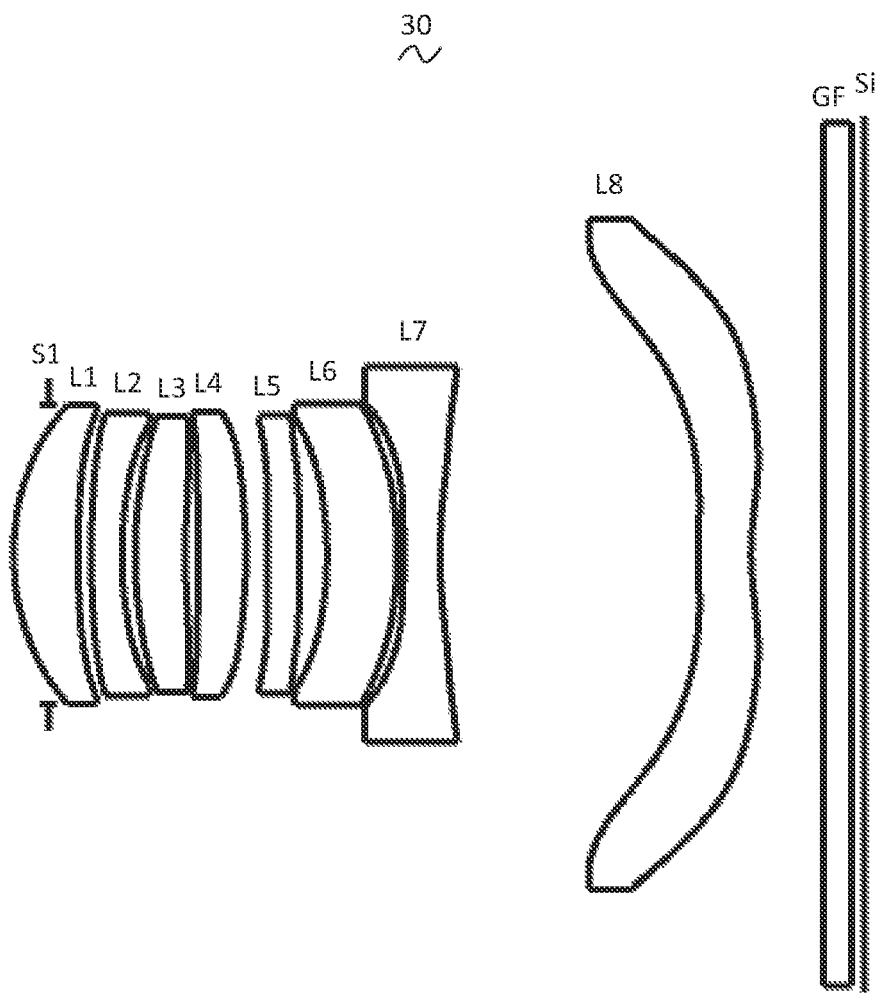
FIG. 9 is a schematic diagram of a structure of a camera optical lens according to Embodiment 3 of the present disclosure.

FIG. 9 shows a schematic diagram of a structure of a camera optical lens 30 in Embodiment 3 of the present disclosure. In this embodiment, the sixth lens L6 has a positive refractive power, the first lens L1 has an image-side surface being concave in the paraxial region, the second lens L2 has an object-side surface being convex in the paraxial region, and the third lens L3 has an object-side surface being convex in the paraxial region.

Table 9 and Table 10 show design data of the camera optical lens 30 in Embodiment 3 of the present disclosure.

TABLE 9

| | R | d | | nd | | vd | |
|---|---|---|---|---|---|---|---|
| S1 | ∞ | d0= | −0.266 | | | | |
| R1 | 1.910 | d1= | 0.491 | nd1 | 1.5444 | v1 | 55.82 |
| R2 | 5.092 | d2= | 0.100 | | | | |
| R3 | 5.108 | d3= | 0.240 | nd2 | 1.6400 | v2 | 23.54 |
| R4 | 4.100 | d4= | 0.100 | | | | |
| R5 | 4.697 | d5= | 0.378 | nd3 | 1.5444 | v3 | 55.82 |
| R6 | 4.351 | d6= | 0.101 | | | | |
| R7 | −29.668 | d7= | 0.367 | nd4 | 1.5444 | v4 | 55.82 |
| R8 | −3.756 | d8= | 0.162 | | | | |
| R9 | 3647.209 | d9= | 0.240 | nd5 | 1.5444 | v5 | 55.82 |
| R10 | −55.541 | d10= | 0.214 | | | | |
| R11 | −3.038 | d11= | 0.537 | nd6 | 1.6400 | v6 | 23.54 |
| R12 | −2.803 | d12= | 0.047 | | | | |

TABLE 9-continued

| | R | d | nd | | vd | |
|---|---|---|---|---|---|---|
| R13 | −10.894 | d13= 0.280 | nd7 | 1.5444 | v7 | 55.82 |
| R14 | 3.268 | d14= 1.973 | | | | |
| R15 | 5.597 | d15= 0.400 | nd8 | 1.5350 | v8 | 55.71 |
| R16 | 1.737 | d16= 0.556 | | | | |
| R17 | ∞ | d17= 0.210 | ndg | 1.5168 | vg | 64.17 |
| R18 | ∞ | d18= 0.100 | | | | |

Table 10 shows aspherical surface data of each lens of the camera optical lens 30 in Embodiment 3 of the present disclosure.

TABLE 10

| | Conic coefficient | Aspheric surface coefficients | | | | |
|---|---|---|---|---|---|---|
| | k | A4 | A6 | A8 | A10 | A12 |
| R1 | 2.8936E−01 | −1.8060E−02 | 8.4616E−02 | −2.3868E−01 | 4.4219E−01 | −4.6820E−01 |
| R2 | 1.8439E+01 | −1.7971E−01 | 4.5162E−01 | −7.0081E−01 | 1.0602E+00 | −1.3660E+00 |
| R3 | −1.7317E+01 | −9.5837E−02 | −3.5439E−03 | 8.8124E−01 | −1.9387E+00 | 1.7680E+00 |
| R4 | −3.0986E−01 | 3.5557E−01 | −1.7333E+00 | 4.9407E+00 | −8.0035E+00 | 7.4588E+00 |
| R5 | 1.5686E+01 | 3.8863E−01 | −1.9727E+00 | 4.6987E+00 | −6.3824E+00 | 5.1005E+00 |
| R6 | −9.8966E+01 | 9.0262E−02 | −8.6743E−01 | 1.8884E+00 | −1.4442E+00 | −3.4048E−01 |
| R7 | −9.8854E+01 | −5.3566E−02 | 1.3981E−01 | −4.1339E−01 | 1.5136E+00 | −2.7659E+00 |
| R8 | −7.4542E+00 | 7.7659E−02 | −3.0788E−02 | −2.0056E−01 | 2.1527E−01 | −9.0164E−02 |
| R9 | 9.9000E+01 | 1.3963E−01 | −7.6127E−01 | 1.0794E+00 | −8.0202E−01 | 5.2849E−01 |
| R10 | −9.9000E+01 | 1.2536E−01 | −8.6388E−01 | 1.1610E+00 | 1.2283E−01 | −1.5388E+00 |
| R11 | 5.2107E+00 | 9.9123E−02 | −4.5105E−01 | 2.9233E−01 | 1.3983E+00 | −3.0403E+00 |
| R12 | 3.9243E−01 | 2.7393E−01 | −1.1785E+00 | 1.9449E+00 | −1.5169E+00 | 4.9243E−01 |
| R13 | 8.0148E+01 | 1.4550E−01 | −1.1157E+00 | 1.7302E+00 | −1.1394E+00 | 2.4667E−01 |
| R14 | −5.8388E+01 | 5.9115E−02 | −2.4980E−01 | 3.5177E−01 | −2.4756E−01 | 9.4038E−02 |
| R15 | 3.7852E+00 | −3.5764E−01 | 3.1766E−01 | −1.7506E−01 | 5.7484E−02 | −1.1463E−02 |
| R16 | −1.8172E+01 | −2.3653E−01 | 1.7071E−01 | −6.7578E−02 | 1.5014E−02 | −1.8967E−03 |

| | Conic coefficient | Aspheric surface coefficients | | | |
|---|---|---|---|---|---|
| | k | A14 | A16 | A18 | A20 |
| R1 | 2.8936E−01 | 2.6078E−01 | −5.9478E−02 | 0.0000E+00 | 0.0000E+00 |
| R2 | 1.8439E+01 | 1.0064E+00 | −2.9621E−01 | 0.0000E+00 | 0.0000E+00 |
| R3 | −1.7317E+01 | −6.9132E−01 | 8.1604E−02 | 0.0000E+00 | 0.0000E+00 |
| R4 | −3.0986E−01 | −3.6816E+00 | 7.3991E−01 | 0.0000E+00 | 0.0000E+00 |
| R5 | 1.5686E+01 | −2.2102E+00 | 3.8184E−01 | 0.0000E+00 | 0.0000E+00 |
| R6 | −9.8966E+01 | 1.0095E+00 | −3.7699E−01 | 0.0000E+00 | 0.0000E+00 |
| R7 | −9.8854E+01 | 2.1917E+00 | −6.2833E−01 | 0.0000E+00 | 0.0000E+00 |
| R8 | −7.4542E+00 | 1.1407E−02 | 1.0749E−03 | 0.0000E+00 | 0.0000E+00 |
| R9 | 9.9000E+01 | −3.6338E−01 | 1.2275E−01 | 0.0000E+00 | 0.0000E+00 |
| R10 | −9.9000E+01 | 1.2954E+00 | −3.5002E−01 | 0.0000E+00 | 0.0000E+00 |
| R11 | 5.2107E+00 | 2.3338E+00 | −6.3410E−01 | 0.0000E+00 | 0.0000E+00 |
| R12 | 3.9243E−01 | −1.8373E−03 | −2.1902E−02 | 0.0000E+00 | 0.0000E+00 |
| R13 | 8.0148E+01 | 4.0942E−02 | −1.6125E−02 | 0.0000E+00 | 0.0000E+00 |
| R14 | −5.8388E+01 | −1.7994E−02 | 1.2980E−03 | 0.0000E+00 | 0.0000E+00 |
| R15 | 3.7852E+00 | 1.3752E−03 | −9.1519E−05 | 2.5861E−06 | 0.0000E+00 |
| R16 | −1.8172E+01 | 1.2645E−04 | −3.3870E−06 | 0.0000E+00 | 0.0000E+00 |

Table 11 and Table 12 show design data of inflexion points and arrest points of each lens of the camera optical lens 30 in Embodiment 3 of the present disclosure.

TABLE 11

| | Number(s) of inflexion points | Inflexion point position 1 | Inflexion point position 2 | Inflexion point position 3 | Inflexion point position 4 |
|---|---|---|---|---|---|
| P1R1 | 1 | 1.135 | / | / | / |
| P1R2 | 1 | 1.045 | / | / | / |
| P2R1 | 1 | 1.055 | / | / | / |
| P2R2 | 0 | / | / | / | / |
| P3R1 | 1 | 0.955 | / | / | / |
| P3R2 | 1 | 0.365 | / | / | / |

TABLE 11-continued

| | Number(s) of inflexion points | Inflexion point position 1 | Inflexion point position 2 | Inflexion point position 3 | Inflexion point position 4 |
|---|---|---|---|---|---|
| P4R1 | 2 | 0.555 | 0.695 | / | / |
| P4R2 | 0 | / | / | / | / |
| P5R1 | 2 | 0.315 | 0.985 | / | / |
| P5R2 | 4 | 0.135 | 0.235 | 0.865 | 1.045 |
| P6R1 | 0 | / | / | / | / |
| P6R2 | 1 | 1.135 | / | / | / |
| P7R1 | 0 | / | / | / | / |
| P7R2 | 3 | 0.535 | 0.855 | 1.425 | / |

TABLE 11-continued

| | Number(s) of inflexion points | Inflexion point position 1 | Inflexion point position 2 | Inflexion point position 3 | Inflexion point position 4 |
|---|---|---|---|---|---|
| P8R1 | 2 | 0.225 | 1.835 | / | / |
| P8R2 | 2 | 0.345 | 2.415 | / | / |

TABLE 12

| | Number(s) of arrest points | Arrest point position 1 |
|---|---|---|
| P1R1 | 0 | / |
| P1R2 | 0 | / |
| P2R1 | 0 | / |
| P2R2 | 0 | / |

TABLE 12-continued

| Number(s) of arrest points | Arrest point position 1 |
|---|---|---|
| P3R1 | 0 | / |
| P3R2 | 1 | 0.845 |
| P4R1 | 0 | / |
| P4R2 | 0 | / |
| P5R1 | 1 | 0.415 |
| P5R2 | 0 | / |
| P6R1 | 0 | / |
| P6R2 | 0 | / |
| P7R1 | 0 | / |
| P7R2 | 0 | / |
| P8R1 | 1 | 0.395 |
| P8R2 | 1 | 0.735 |

Figure 10:
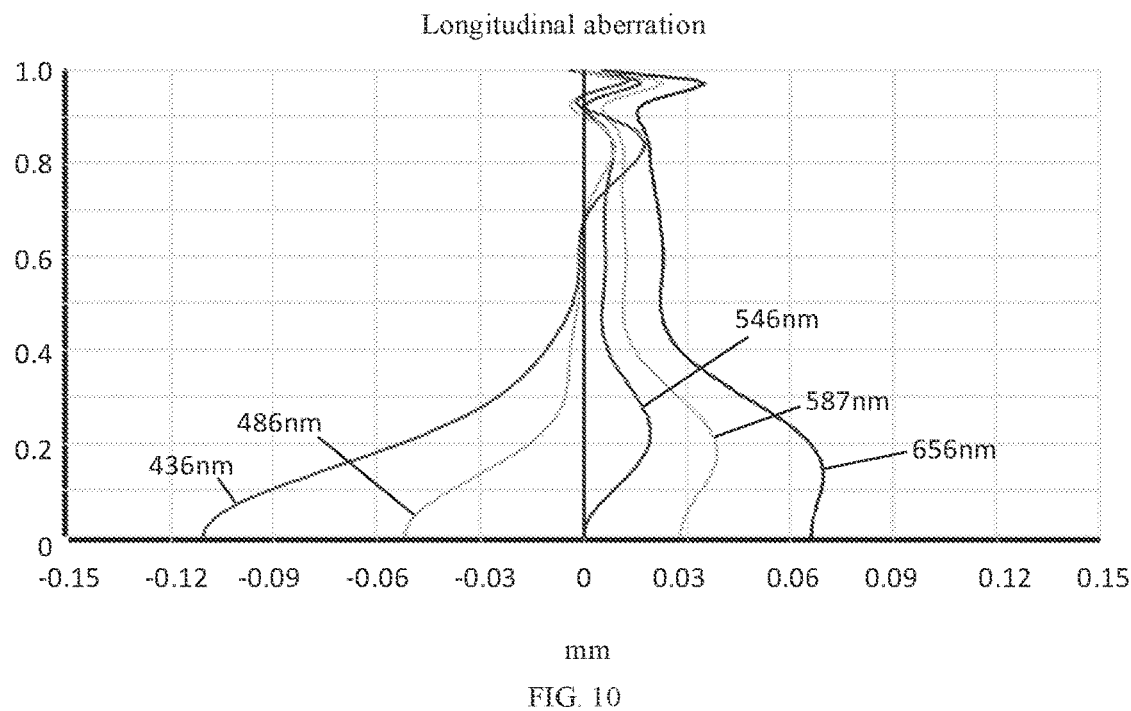
FIG. 10 is a schematic diagram of a longitudinal aberration of the camera optical lens shown in FIG. 9.
Figure 11:
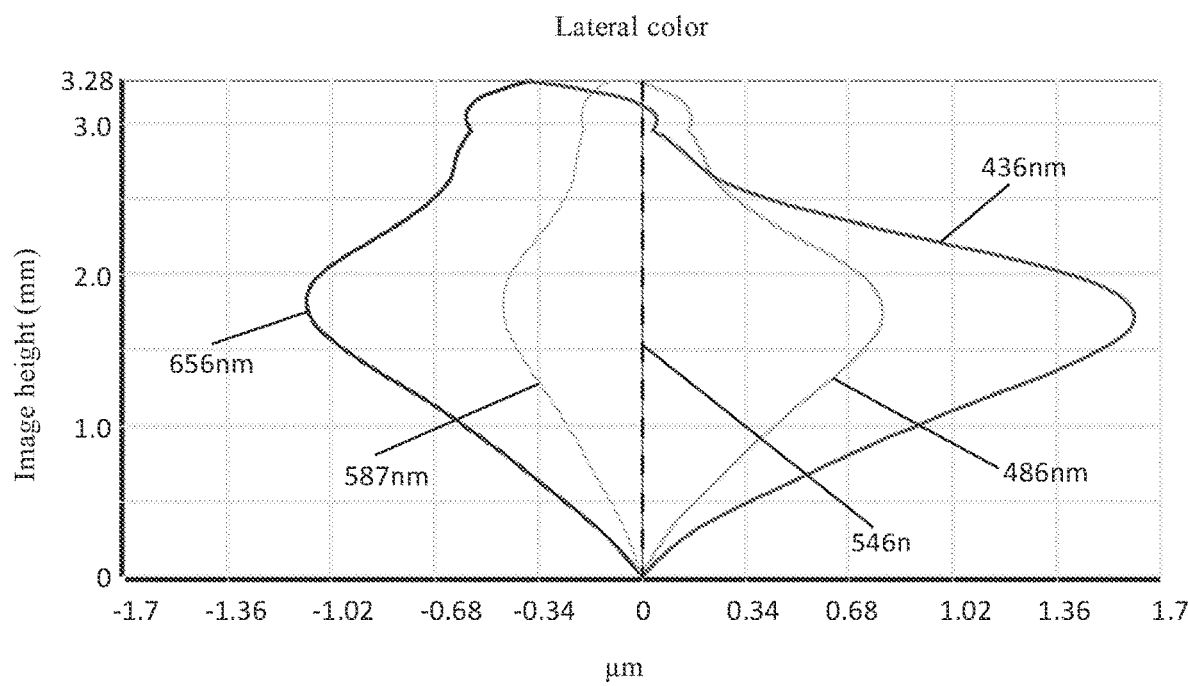
FIG. 11 is a schematic diagram of a lateral color of the camera optical lens shown in FIG. 9.
Figure 12:
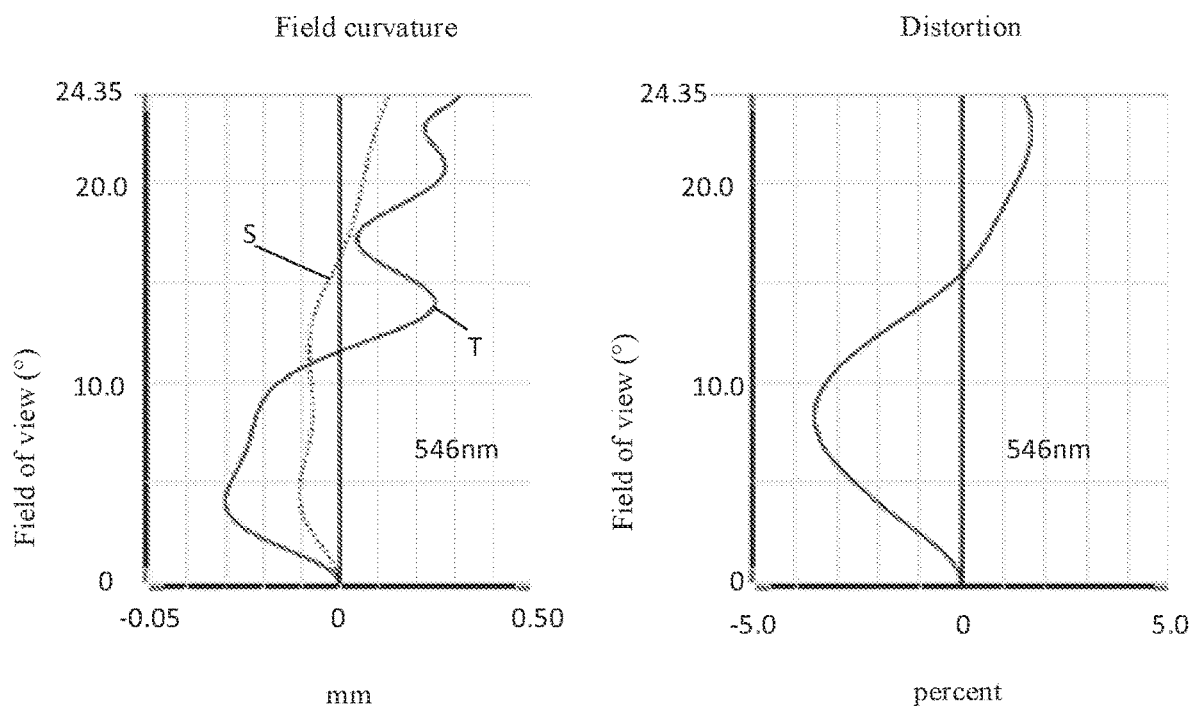
FIG. 12 is a schematic diagram of a field curvature and a distortion of the camera optical lens shown in FIG. 9.

FIG. 10 and FIG. 11 show a longitudinal aberration and a lateral color of light with wavelengths of 656 nm, 587 nm, 546 nm, 486 nm and 436 nm after passing the camera optical lens 30 in Embodiment 3. FIG. 12 illustrates a schematic diagram of a field curvature and a distortion of light with a wavelength of 546 nm after passing the camera optical lens 30 in Embodiment 3. A field curvature S in FIG. 12 is a field curvature in a sagittal direction, and T is a field curvature in a tangential direction.

Table 13 in the following shows values corresponding to various conditions according to the aforementioned conditions in this embodiment. Apparently, the camera optical lens 30 in this embodiment satisfies the aforementioned conditions.

In this embodiment, an entrance pupil diameter (ENPD) of the camera optical lens 30 is 2.305 mm, an image height (IH) of 1.0H is 3.282 mm, and a field of view (FOV) in a diagonal direction is 48.70°. Thus, the camera optical lens 30 meets design requirements for long focal length and ultra-thinness. Its on-axis and off-axis chromatic aberrations are sufficiently corrected, thereby achieving excellent optical performance.

TABLE 13

| Parameters and conditions | Embodiment 1 | Embodiment 2 | Embodiment 3 |
|---|---|---|---|
| f/TTL | 0.96 | 1.01 | 1.10 |
| f2/f | −2.02 | −3.52 | −4.96 |
| (R9 + R10)/(R9 − R10) | 0.40 | 0.70 | 0.97 |
| f | 6.447 | 6.598 | 7.145 |
| f1 | 3.000 | 4.530 | 5.300 |
| f2 | −13.022 | −23.223 | −35.439 |
| f3 | −9.252 | −127.618 | −175.758 |
| f4 | 54.658 | 20.088 | 7.826 |
| f5 | 12.833 | 16.956 | 100.067 |
| f6 | −40.005 | 145.701 | 29.593 |
| f7 | −10.276 | −7.479 | −4.566 |
| f8 | −5.814 | −8.057 | −4.865 |
| f12 | 3.723 | 5.333 | 5.956 |
| FNO | 2.99 | 3.00 | 3.10 |
| TTL | 6.726 | 6.501 | 6.496 |
| IH | 3.282 | 3.282 | 3.282 |
| FOV | 53.00° | 53.12° | 48.70° |

It will be understood by those of ordinary skills in the art that the embodiments described above are specific embodiments realizing the present disclosure. In practice, various changes may be made to these embodiments in form and in detail without departing from the spirit and scope of the disclosure.

What is claimed is:

1. A camera optical lens comprising eight lenses which are, from an object side to an image side in sequence: a first lens having a positive refractive power, a second lens having a negative refractive power, a third lens having a negative refractive power, a fourth lens having a positive refractive power, a fifth lens having a positive refractive power, a sixth lens having a refractive power, a seventh lens having a negative refractive power and an eighth lens having a negative refractive power;

wherein the camera optical lens satisfies following conditions:

$$0.95 \leq f/TTL;$$

$$-5.00 \leq f2/f \leq -2.00; \text{ and}$$

$$0.40 \leq (R9+R10)/(R9-R10) \leq 1.00;$$

where

TTL denotes a total optical length from an object-side surface of the first lens to an image surface of the camera optical lens along an optical axis;
f denotes a focal length of the camera optical lens;
f2 denotes a focal length of the second lens;
R9 denotes a central curvature radius of an object-side surface of the fifth lens; and
R10 denotes a central curvature radius of an image-side surface of the fifth lens.

2. The camera optical lens according to claim 1, wherein the camera optical lens further satisfies the following condition:

$$0.10 \leq d13/d14 \leq 1.30;$$

where d13 denotes an on-axis thickness of the seventh lens; and
d14 denotes an on-axis distance from an image-side surface of the seventh lens to an object-side surface of the eighth lens.

3. The camera optical lens according to claim 1, wherein the camera optical lens further satisfies following conditions:

$$0.23 \leq f1/f \leq 1.11;$$

$$-4.40 \leq (R1+R2)/(R1-R2) \leq -0.47; \text{ and}$$

$$0.04 \leq d1/TTL \leq 0.14;$$

where f1 denotes a focal length of the first lens;
R1 denotes a central curvature radius of the object-side surface of the first lens;
R2 denotes a central curvature radius of an image-side surface of the first lens; and
d1 denotes an on-axis thickness of the first lens.

4. The camera optical lens according to claim 1, wherein the camera optical lens further satisfies following conditions:

$$-1.32 \leq (R3+R4)/(R3-R4) \leq 13.70; \text{ and}$$

$$0.02 \leq d3/TTL \leq 0.06;$$

where

R3 denotes a central curvature radius of an object-side surface of the second lens;
R4 denotes a central curvature radius of an image-side surface of the second lens; and
d3 denotes an on-axis thickness of the second lens.

5. The camera optical lens according to claim 1, wherein the camera optical lens further satisfies following conditions:

$$-49.20 \leq f3/f \leq -0.96;$$

$$0.33 \leq (R5+R6)/(R5-R6) \leq 39.23; \text{ and}$$

$$0.02 \leq d5/TTL \leq 0.09;$$

where
f3 denotes a focal length of the third lens;
R5 denotes a central curvature radius of an object-side surface of the third lens;
R6 denotes a central curvature radius of an image-side surface of the third lens; and
d5 denotes an on-axis thickness of the third lens.

6. The camera optical lens according to claim 1, wherein the camera optical lens further satisfies following conditions:

$$0.55 \leq f4/f \leq 12.72;$$

$$0.64 \leq (R7+R8)/(R7-R8) \leq 9.96; \text{ and}$$

$$0.02 \leq d7/TTL \leq 0.11;$$

where
f4 denotes a focal length of the fourth lens;
R7 denotes a central curvature radius of an object-side surface of the fourth lens;
R8 denotes a central curvature radius of an image-side surface of the fourth lens; and
d7 denotes an on-axis thickness of the fourth lens.

7. The camera optical lens according to claim 1, wherein the camera optical lens further satisfies following conditions:

$$1.00 \leq f5/f \leq 21.01; \text{ and}$$

$$0.02 \leq d9/TTL \leq 0.08;$$

where
f5 denotes a focal length of the fifth lens; and
d9 denotes an on-axis thickness of the fifth lens.

8. The camera optical lens according to claim 1, wherein the camera optical lens further satisfies following conditions:

$$-12.41 \leq f6/f \leq 33.12;$$

$$-63.27 \leq (R11+R12)/(R11-R12) \leq 37.28; \text{ and}$$

$$0.04 \leq d11/TTL \leq 0.19;$$

where
f6 denotes a focal length of the sixth lens;
R11 denotes a central curvature radius of an object-side surface of the sixth lens;
R12 denotes a central curvature radius of an image-side surface of the sixth lens; and
d11 denotes an on-axis thickness of the sixth lens.

9. The camera optical lens according to claim 1, wherein the camera optical lens further satisfies following conditions:

$$-3.19 \leq f7/f \leq -0.43;$$

$$-1.07 \leq (R13+R14)/(R13-R14) \leq 1.26; \text{ and}$$

$$0.02 \leq d13/TTL \leq 0.28;$$

where
f7 denotes a focal length of the seventh lens;
R13 denotes a central curvature radius of an object-side surface of the seventh lens;
R14 denotes a central curvature radius of an image-side surface of the seventh lens; and
d13 denotes an on-axis thickness of the seventh lens.

10. The camera optical lens according to claim 1, wherein the camera optical lens further satisfies following conditions:

$$-2.44 \leq f8/f \leq -0.45;$$

$$0.95 \leq (R15+R16)/(R15-R16) \leq 3.81; \text{ and}$$

$$0.03 \leq d15/TTL \leq 0.10;$$

where
f8 denotes a focal length of the eighth lens;
R15 denotes a central curvature radius of an object-side surface of the eighth lens;
R16 denotes a central curvature radius of an image-side surface of the eighth lens; and
d15 denotes an on-axis thickness of the eighth lens.

* * * * *